(12) United States Patent
Sun

(10) Patent No.: US 8,950,879 B2
(45) Date of Patent: Feb. 10, 2015

(54) LASER PROJECTION MODULE WITH CONICAL REFLECTOR SUPPORTED BY THIN WALLS

(75) Inventor: Jianhua Sun, Xi'an (CN)

(73) Assignee: Huanic Corporation, Xi'an, Shaanxi (CN)

( * ) Notice: Subject to any disclaimer, the term of this patent is extended or adjusted under 35 U.S.C. 154(b) by 463 days.

(21) Appl. No.: 13/504,655

(22) PCT Filed: Dec. 4, 2009

(86) PCT No.: PCT/CN2009/075309
§ 371 (c)(1),
(2), (4) Date: Jul. 13, 2012

(87) PCT Pub. No.: WO2011/050548
PCT Pub. Date: May 5, 2011

(65) Prior Publication Data
US 2012/0275043 A1 Nov. 1, 2012

(30) Foreign Application Priority Data

Nov. 2, 2009 (CN) .......................... 2009 1 0218734

(51) Int. Cl.
*G02B 7/182* (2006.01)
*G01C 5/00* (2006.01)
(Continued)

(52) U.S. Cl.
CPC .......... *G01C 15/004* (2013.01); *G02B 27/0977* (2013.01); *G02B 19/0052* (2013.01); *G02B 19/0023* (2013.01)
USPC ................ 359/868; 359/871; 33/276; 33/286

(58) Field of Classification Search
USPC ............. 359/834, 868, 871, 872; 33/276, 286
See application file for complete search history.

(56) References Cited

U.S. PATENT DOCUMENTS 2,891,437 A * 6/1959 Tripp ............................ 356/247
3,601,476 A * 8/1971 Mackenzie ................... 359/874

(Continued)

FOREIGN PATENT DOCUMENTS

| CN | 1338612 A | 3/2002 |
|---|---|---|
| CN | 2699235 Y | 5/2005 |

(Continued)

OTHER PUBLICATIONS

International Search Report for International Application No. PCT/CN2009/075309, mailed Aug. 5, 2010 (6 pages).

(Continued)

*Primary Examiner* — Ricky D Shafer
(74) *Attorney, Agent, or Firm* — Clark & Elbing LLP

(57) ABSTRACT

A laser projection module with a conical reflector supported by thin walls comprises: an upper mounting plate, a lower mounting plate with an aperture set in the center and a conical reflector which is provided on the upper mounting plate corresponding to the aperture, wherein at least three thin-walled supporting slices surrounding the conical mirror, are provided between the upper mounting plate and the lower mounting plate there are provided. The disclosure has a compact structure. With the support of the thin walls, the laser divided is self-assembled and the mechanical principle that side faces of the thin-walled slices have high resistance is satisfied, so that reliability and precision of the use of the conical mirror in a laser projection apparatus with the conical mirror are guaranteed. The support pattern of the conical mirror by thin walls is also applicable to various conical mirrors in other application occasions.

17 Claims, 2 Drawing Sheets

(51) Int. Cl.
*G01C 15/00* (2006.01)
*G02B 27/09* (2006.01)
*G02B 19/00* (2006.01)

(56) References Cited

U.S. PATENT DOCUMENTS

| | | | |
|---|---|---|---|
| 4,657,360 A * | 4/1987 | Izukawa et al. | 359/859 |
| 4,679,937 A | 7/1987 | Cain et al. | |
| 4,767,208 A | 8/1988 | Cain et al. | |
| 5,754,327 A * | 5/1998 | Masotti et al. | 359/198.1 |
| 5,988,314 A * | 11/1999 | Negishi | 181/144 |
| 7,328,516 B2 | 2/2008 | Nash et al. | |
| 8,562,145 B2 * | 10/2013 | Roberts et al. | 353/77 |
| 2007/0028469 A1 | 2/2007 | Nash et al. | |

FOREIGN PATENT DOCUMENTS

| | | |
|---|---|---|
| CN | 2791601 Y | 6/2006 |
| CN | 101178450 A | 5/2008 |
| CN | 201141767 Y | 10/2008 |
| JP | 6331356 A | 12/1994 |
| JP | 10318750 A | 12/1998 |

OTHER PUBLICATIONS

International Preliminary Report on Patentability for International Application No. PCT/CN2009/075309, issued May 8, 2012 (5 pages).
Written Opinion of the International Searching Authority for International Application No. PCT/CN2009/075309, mailed Aug. 5, 2010 (4 pages).

* cited by examiner

LASER PROJECTION MODULE WITH CONICAL REFLECTOR SUPPORTED BY THIN WALLS

CROSS-REFERENCE TO RELATED APPLICATIONS

This application is the U.S. National Stage filing under 35 U.S.C. §371 of International Application No. PCT/CN2009/075309, filed Dec. 4, 2009, which claims the benefit of Chinese Patent Application No. 200910218734.6, filed Nov. 2, 2009.

TECHNICAL FIELD OF THE INVENTION

The disclosure relates to a laser projection apparatus, in particular to a laser projection module with a conical reflector supported by thin walls.

BACKGROUND OF THE INVENTION

At present, a conical reflector is adopted to project a laser beam to form a circular laser plane and thus to form a 360 degrees laser line when projected into space. Compared with the common mode of using four linear laser sources to form a 360 degrees laser line, this projection mode has advantages of lower cost, less energy consumption, compacter structure and better uniformity of laser line. Therefore, this projection mode has superiority in the application on a laser projection apparatus. However, when the conical reflector is applied to the 360 degrees laser projection apparatus, the support problem for the conical reflector has not been well resolved so far. At present, it is common to adopt a photoplastic square-tapered shell or a transparent cylinder to support the conical reflector. Since the cambered surface of the four corners of the square taper or the cylinder would create a secondary projection to the laser line, once the line of the secondary projection is not perpendicular to the laser plane reflected by the conical reflector, the line of the secondary projection of the square taper or the cylinder used for supporting is not overlapped with the 360 degrees laser line reflected by the conical reflector, thus a double-image phenomenon is caused. It is very difficult to adjust the perpendicularity of the square-tapered body or cylinder which is used for supporting. Besides, the photoplastic material is greatly impacted by temperature of the environment and the shape is easy to be changed, causing great influence to the linearity of the laser line and stability and reliability of the use of the apparatus are impacted.

SUMMARY OF THE INVENTION

In order to solve the technical problem mentioned in the background, the disclosure provides a laser projection module with a conical reflector supported by thin walls, for trisecting or quartering and self-assembling a laser circumference line, which well solves the support problem of a conical mirror.

The special feature of the technical solution of the disclosure lies in that the laser projection module with a conical reflector supported by thin walls is realized by the support of thin walls. When an input laser beam projects on the tapered body of the conical mirror in a manner of being perpendicular to the bottom plane of the conical mirror, a laser reflecting plane perpendicular to the input laser can be formed. Thus when projected into space, the laser beam displays as a 360 degrees laser projection line. A group of four thin-walled supporting slices supports the conical mirror, and meanwhile divides the laser reflecting plane. When the angles of the thin-walled supporting slices are adjusted to be perpendicular to the circumference of the conical mirror and the extension lines of the thin-walled supporting slices pass through the center point of the conical mirror, the divided laser reflecting plane would be self-assembled (that is, the directions of the thin-walled supporting slices are perpendicular to the circumference of the conical mirror and the extension lines of the thin-walled supporting slices pass through the center point of the conical mirror, the thin-walled supporting slices support the conical mirror and the divided laser reflecting plane is self-assembled). Thus, supporting to the laser projection module with a conical mirror is realized, and break lines to the laser projection would not be caused.

The special feature of the disclosure lies in that the laser projection module with a conical reflector supported by thin walls comprise a conical mirror, an upper mounting plate, a lower mounting plate with an aperture and thin-walled supporting slices, wherein the top of the conical mirror is fixed on the bottom plane of the upper mounting plate; the upper mounting plate and the lower mounting plate are fixed through four (or three) thin-walled supporting slices.

The thin-walled supporting slices are made of rigid materials such as carbon steel, alloy steel or carbon fiber, wherein the wall thicknesses range from 0.01 mm to 5.0 mm.

The special feature of the disclosure lies in that the laser projection module with a conical reflector supported by thin walls further comprises a conical mirror adjustment mechanism, which comprises an adjustment base for mounting the conical mirror, four adjustment bolts and an upper mounting plate. The adjustment base is provided on the upper mounting plate through the four adjustment bolts and the top of the conical mirror is fixed on the bottom plane of the adjustment base. In order to mount the conical mirror on the adjustment base and to adjust the conical mirror, the position of the upper mounting plate for mounting the adjustment base is provided with a hole. The hole is generally provided on the center part of the upper mounting plate and the diameter of the hole should be larger than the diameter of the top of the conical mirror, so that the conical mirror and the adjustment base can be fixed. After the module is mounted, any angle of the adjustment base and the conical mirror in the space can be changed through the four adjustment bolts, so as to enable the laser plane reflected by the conical mirror to be perpendicular to the input laser or to be parallel with or perpendicular to a set reference plane.

The disclosure has a compact structure. With the support of the thin walls, the laser divided is self-assembled and the mechanical principle that side faces of the thin-walled slices have high resistance is satisfied, so that reliability and precision of the use of the conical mirror in a laser projection apparatus with the conical mirror are guaranteed. The support pattern of the conical mirror by thin walls is also applicable to different kinds of conical mirrors in other application occasions.

DETAILED DESCRIPTION OF THE EMBODIMENTS

Figure 1:
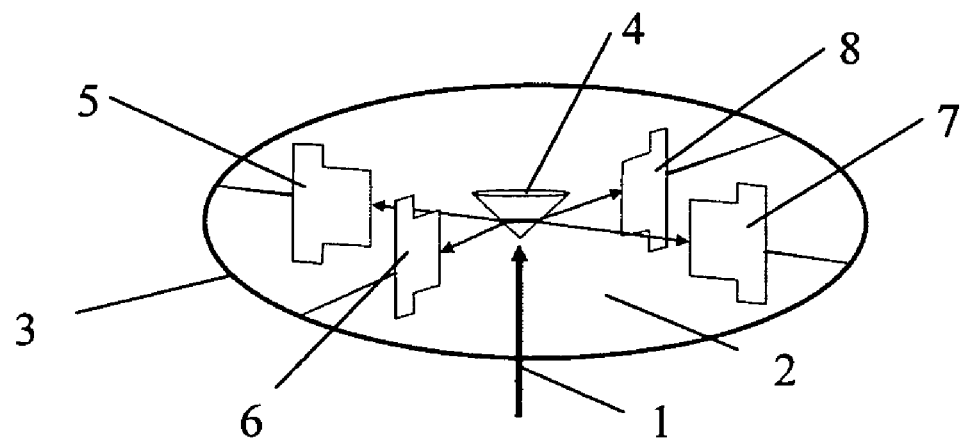
FIG. 1 shows a view of the working principle of the disclosure.
Figure 2:
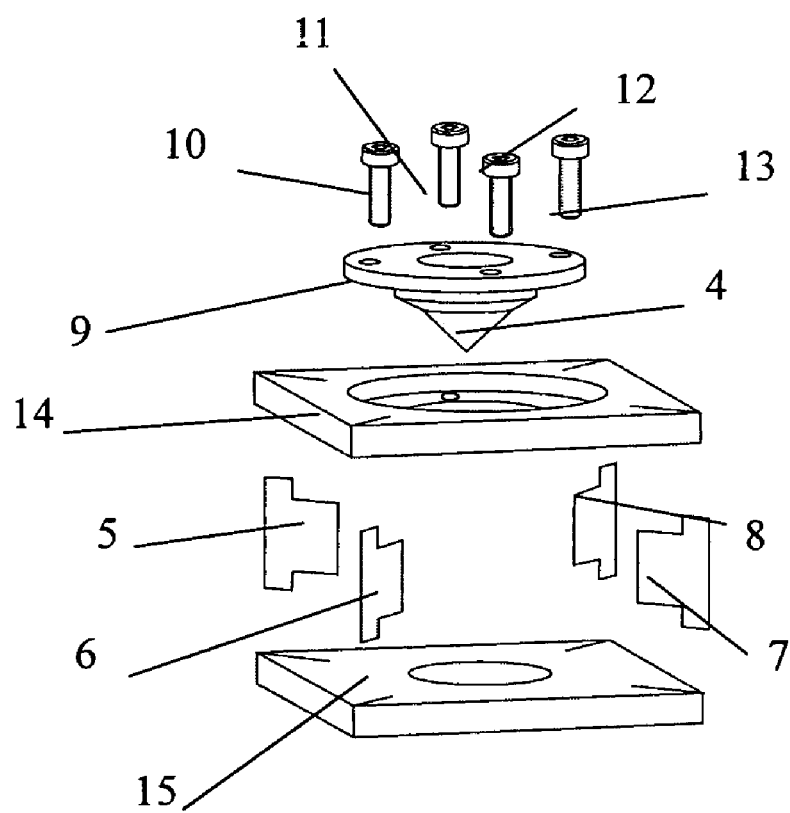
FIG. 2 shows an exploded view of the disclosure.
Figure 3:
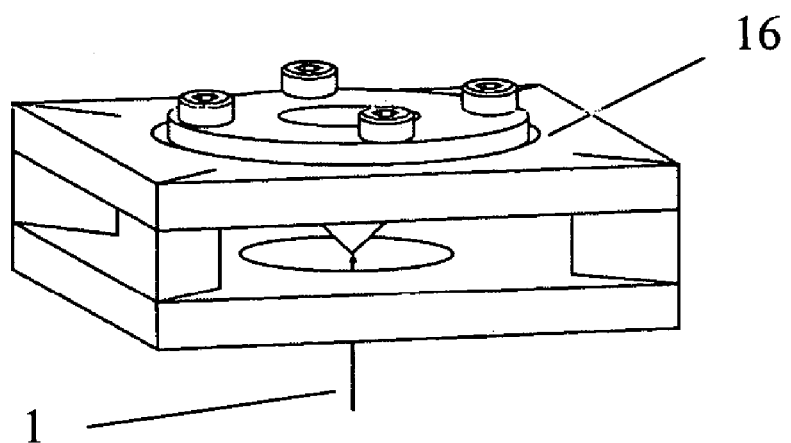
FIG. 3 shows a perspective view of the disclosure.

As is shown in FIG. 1 and FIG. 2, the working principle of the laser projection module 16 with a conical reflector supported by thin walls in the disclosure is that: when an input laser beam 1 projects on the tapered body of a conical reflector mirror or a conical transparent mirror 4 in a manner of being perpendicular to the bottom plane of the conical reflector mirror or the conical transparent mirror 4, a laser reflecting plane 2 perpendicular to the input laser is formed. When projected into space, the laser beam displays as a 360 degrees laser line 3 reflected the conical mirror. The thin-walled supporting slices 5, 6, 7, 8 divide the laser line 3 reflected by the conical mirror into four segments of circular arc lines each of which is with 90 degrees. When the angles of the thin-walled supporting slices 5, 6, 7, 8 are adjusted, the directions of the thin-walled supporting slices 5, 6, 7, 8 are made to be perpendicular to the circumference of the conical reflector mirror or the conical transparent mirror 4 and the extension lines of the thin-walled supporting slices are enabled to pass through the center point of the conical reflector mirror or the conical transparent mirror 4, then the divided laser reflecting plane 2 would be self-assembled, that is, the conical reflector mirror or the conical transparent mirror 4 is supported and the divided laser reflecting plane is self-assembled. Thus, the adjustment to the thin-walled supporting slices 5, 6, 7, 8 realizes the support to the laser projection module 16 with a conical reflector, without generating break line to the 360 degrees laser projection line 3. The input laser 1 is the laser output after optical convergence, with a wavelength ranged from 400 nm to 1340 nm.

As is shown in FIG. 2, the laser projection module 16 with a conical reflector supported by thin walls comprises adjustment bolts 10, 11, 12, 13, an adjustment base 9, a conical reflector mirror or a conical transparent mirror 4, an upper mounting plate 14, a lower mounting plate 15 the center part of which is provided with an aperture corresponding to the bottom of the conical reflector mirror or conical transparent mirror 4, and thin-walled supporting slices 5, 6, 7, 8. The conical reflector mirror or the conical transparent mirror 4 is provided on the lower end plane (bottom plane) of the adjustment base 9, and the adjustment base 9 is fixed on the upper mounting plate 14 through the four adjustment bolts 10, 11, 12, 13. Between the upper mounting plate 14 and the lower mounting plate 15 are supported and connected by the four thin-walled supporting slices 5, 6, 7, 8, wherein the thin-walled supporting slices 5, 6, 7, 8 are made of rigid materials such as carbon steel, alloy steel or carbon fiber, with wall thickness ranged from 1.0 mm to 0.1 mm. The lower mounting plate 15 can be connected on an application apparatus through bolts.

The adjustment base 9 for mounting the conical reflector mirror or the conical transparent mirror 4, the four adjustment bolts 10, 11, 12, 13, and the upper mounting plate 14 form a conical mirror (conical reflector) adjustment mechanism of the laser projection module 16 with a conical reflector supported by thin walls. In order to mount the conical reflector mirror or the conical transparent mirror 4 on the adjustment base 9 and to adjust the conical reflector mirror or the conical transparent mirror 4, a hole is provided on the upper mounting plate 14 where the adjustment base 9 is mounted. The hole is generally provided on the center part of the upper mounting plate 14 and the diameter of the hole should be larger than the diameter of the top of the conical reflector mirror or the conical transparent mirror 4, so that the conical reflector mirror or the conical transparent mirror 4 and the adjustment base 9 can be fixed. After the module is applied and mounted, any angle of the adjustment base 9 and the conical reflector mirror or the conical transparent mirror 4 in the space can be changed through the four adjustment bolts 10, 11, 12, 13, so as to enable the laser plane 2 reflected by the conical mirror to be perpendicular to the input laser 1 or to be parallel with or perpendicular to a set reference plane.

The shape of the laser projection module 16 with a conical reflector supported by thin walls in the disclosure can be square or circular.

The invention claimed is:

1. A laser projection module with a conical reflector supported by thin walls, comprising:
an upper mounting plate,
a lower mounting plate with an aperture set in a center thereof, and
a conical mirror provided on the upper mounting plate corresponding to the aperture,
wherein at least three thin-walled supporting slices, surrounding the conical mirror, are provided between the upper mounting plate and the lower mounting plate; the thin-walls of the thin-walled supporting slices are perpendicular to the circumference of the conical mirror and extension lines of the thin-walled supporting slices pass through a center point of the conical mirror.

2. The laser projection module with a conical reflector supported by thin walls according to claim 1, wherein the thin-walled supporting slices are evenly distributed between the upper mounting plate and the lower mounting plate.

3. The laser projection module with a conical reflector supported by thin walls according to claim 2, wherein wall thicknesses of the thin-walled supporting slices range from 0.01 mm to 5.0 mm.

4. The laser projection module with a conical reflector supported by thin walls according to claim 3, wherein the thin-walled supporting slices are made of carbon steel, alloy steel or carbon fiber.

5. The laser projection module with a conical reflector supported by thin walls according to claim 4, wherein there are four thin-walled supporting slices, which are provided between four corners of the upper mounting plate and the four corners of the lower mounting plate respectively.

6. The laser projection module with a conical reflector supported by thin walls according to claim 4, wherein the laser projection module further comprises an adjustment base, a mounting hole is provided on the top of the upper mounting plate, the diameter of the mounting hole is less than a diameter of the adjustment base but larger than a diameter of the top of the conical mirror; the adjustment base is fixed on the upper mounting plate; the top of the conical mirror passes through the mounting hole and is fixed on the bottom of the adjustment base, and the bottom of the conical mirror is provided between the upper mounting plate and the lower mounting plate and faces the aperture on the lower mounting plate.

7. The laser projection module with a conical reflector supported by thin walls according to claim 4, wherein the shape of the module is square or circular.

8. The laser projection module with a conical reflector supported by thin walls according to claim 3, wherein there are four thin-walled supporting slices, which are provided between four corners of the upper mounting plate and the four corners of the lower mounting plate respectively.

9. The laser projection module with a conical reflector supported by thin walls according to claim 8, wherein the laser projection module further comprises an adjustment base, a mounting hole is provided on the top of the upper mounting plate, the diameter of the mounting hole is less than a diameter of the adjustment base but larger than a diameter of the top of the conical mirror; the adjustment base is fixed on the upper mounting plate; the top of the conical mirror passes through the mounting hole and is fixed on the bottom of the adjustment base, and the bottom of the conical mirror is provided between the upper mounting plate and the lower mounting plate and faces the aperture on the lower mounting plate.

10. The laser projection module with a conical reflector supported by thin walls according to claim 3, wherein the laser projection module further comprises an adjustment base, a mounting hole is provided on the top of the upper mounting plate, the diameter of the mounting hole is less than a diameter of the adjustment base but larger than a diameter of the top of the conical mirror; the adjustment base is fixed on the upper mounting plate; the top of the conical mirror passes through the mounting hole and is fixed on the bottom of the adjustment base, and the bottom of the conical mirror is provided between the upper mounting plate and the lower mounting plate and faces the aperture on the lower mounting plate.

11. The laser projection module with a conical reflector supported by thin walls according to claim 3, wherein the shape of the module is square or circular.

12. The laser projection module with a conical reflector supported by thin walls according to claim 2, wherein the laser projection module further comprises an adjustment base, a mounting hole is provided on the top of the upper mounting plate, the diameter of the mounting hole is less than a diameter of the adjustment base but larger than a diameter of the top of the conical mirror; the adjustment base is fixed on the upper mounting plate; the top of the conical mirror passes through the mounting hole and is fixed on the bottom of the adjustment base, and the bottom of the conical mirror is provided between the upper mounting plate and the lower mounting plate and faces the aperture on the lower mounting plate.

13. The laser projection module with a conical reflector supported by thin wall according to claim 2, wherein the shape of the module is square or circular.

14. The laser projection module with a conical reflector supported by thin walls according to claim 1, wherein the laser projection module further comprises an adjustment base, a mounting hole is provided on the top of the upper mounting plate, the diameter of the mounting hole is less than a diameter of the adjustment base but larger than a diameter of the top of the conical mirror; the adjustment base is fixed on the upper mounting plate; the top of the conical mirror passes through the mounting hole and is fixed on the bottom of the adjustment base, and the bottom of the conical mirror is provided between the upper mounting plate and the lower mounting plate and faces the aperture on the lower mounting plate.

15. The laser projection module with a conical reflector supported by thin walls according to claim 14, wherein the conical mirror is a conical reflector mirror or a conical transparent mirror.

16. The laser projection module with a conical reflector supported by thin walls according to claim 1, wherein the shape of the module is square or circular.

17. The laser projection module with a conical reflector supported by thin walls according to claim 16, wherein the conical mirror is a conical reflector mirror or a conical transparent mirror.

* * * * *